United States Patent
Shams et al.

(10) Patent No.: US 11,399,231 B2
(45) Date of Patent: Jul. 26, 2022

(54) EXTREME LOW FREQUENCY MICROPHONE/HYDROPHONE FOR EXPLORATION OF OCEANIC AND ATMOSPHERIC DYNAMICS

(71) Applicant: UNITED STATES OF AMERICA AS REPRESENTED BY THE ADMINISTRATOR OF NASA, Washington, DC (US)

(72) Inventors: Qamar A. Shams, Yorktown, VA (US); Allan J. Zuckerwar, Williamsburg, VA (US)

(73) Assignee: UNITED STATES OF AMERICA AS REPRESENTED BY THE ADMINISTRATOR OF NASA, Washington, DC (US)

(*) Notice: Subject to any disclaimer, the term of this patent is extended or adjusted under 35 U.S.C. 154(b) by 282 days.

(21) Appl. No.: 16/787,359

(22) Filed: Feb. 11, 2020

(65) Prior Publication Data
US 2021/0099793 A1    Apr. 1, 2021

Related U.S. Application Data

(60) Provisional application No. 62/907,123, filed on Sep. 27, 2019.

(51) Int. Cl.
| | |
|---|---|
| *H04R 1/44* | (2006.01) |
| *G01V 1/38* | (2006.01) |
| *H04R 31/00* | (2006.01) |
| *G01V 1/18* | (2006.01) |

(52) U.S. Cl.
CPC .............. *H04R 1/44* (2013.01); *G01V 1/186* (2013.01); *G01V 1/38* (2013.01); *H04R 31/003* (2013.01)

(58) Field of Classification Search
CPC .......... H04R 1/44; H04R 31/003; H04R 1/04; G01V 1/188; G01V 1/186; G01V 1/38; G01V 1/72
See application file for complete search history.

(56) References Cited

U.S. PATENT DOCUMENTS

| | | | | |
|---|---|---|---|---|
| 4,281,222 A | * | 7/1981 | Nakagawa | ........... H04R 19/016 381/174 |
| 6,975,736 B2 | * | 12/2005 | Hasegawa | .............. H04R 19/04 381/174 |
| 8,401,217 B2 | | 3/2013 | Shams et al. | |
| 8,871,783 B2 | | 3/2014 | Zuckerwar et al. | |
| 9,445,779 B2 | | 9/2016 | Shams et al. | |

(Continued)

FOREIGN PATENT DOCUMENTS

CN           205506202 U  *  8/2016

*Primary Examiner* — Ian J Lobo
(74) *Attorney, Agent, or Firm* — M. Bruce Harper; Robin W. Edwards; Helen M. Galus

(57) ABSTRACT

An extremely low frequency hydrophone includes a housing forming an interior space comprising a backchamber. The housing includes an opening to the interior space, and a side of the housing comprises a diaphragm plate. A backplate is disposed inside the housing adjacent the diaphragm plate, and an electronics unit including a preamplifier is disposed in the interior space. The hydrophone further includes dielectric liquid substantially filling the interior space. A passageway permits inert gas to be introduced into the dielectric liquid in the interior space of the housing.

20 Claims, 3 Drawing Sheets

(56) References Cited

U.S. PATENT DOCUMENTS

| | | |
|---|---|---|
| 9,591,417 B2 | 3/2017 | Shams et al. |
| 9,867,591 B2 | 1/2018 | Shams et al. |
| 10,076,772 B2 * | 9/2018 | Xu .................... H01L 41/1138 |
| 10,392,125 B2 | 8/2019 | Shams et al. |
| 2009/0022341 A1 | 1/2009 | Shams et al. |
| 2018/0210065 A1 | 7/2018 | Shams et al. |
| 2019/0154874 A1 | 5/2019 | Shams et al. |

* cited by examiner

EXTREME LOW FREQUENCY MICROPHONE/HYDROPHONE FOR EXPLORATION OF OCEANIC AND ATMOSPHERIC DYNAMICS

CROSS-REFERENCE TO RELATED PATENT APPLICATION

This application claims the benefit under 35 U.S.C. § 119(e) to U.S. Provisional Patent Application No. 62/907,123, filed Sep. 27, 2019, entitled "EXTREME LOW FREQUENCY MICROPHONE/HYDROPHONE FOR EXPLORATION OF OCEANIC AND ATMOSPHERIC DYNAMICS," which is incorporated herein by reference in its entirety.

STATEMENT REGARDING FEDERALLY SPONSORED RESEARCH OR DEVELOPMENT

The invention described herein was made by an employee/employees of the United States Government and may be manufactured and used by or for the Government of the United States of America for governmental purposes without the payment of any royalties thereon or therefore.

BACKGROUND OF THE INVENTION

Sound at frequencies below 20 Hz is termed "infrasound." A particularly favorable property of infrasound is its propagation over long distances with little attenuation. Infrasound has this property because atmospheric absorption is practically negligible at infrasonic frequencies, and because there is an acoustic "ceiling" in the stratosphere where a positive gradient of the speed of sound versus altitude causes reflections of infrasonic rays back to Earth. Infrasound propagation over long distances (e.g., thousands of kilometers) is predominantly due to refractive ducting from the upper layers in the atmosphere, while propagation over short distances is completed by direct path.

Infrasound is radiated by a variety of geophysical processes including earthquakes, severe weather events, volcanic activity, ocean waves, avalanches, turbulence aloft, and meteors. Infrasound sensors have been used for Nuclear Test Ban Treaty monitoring, for which there are a number of infrasonic listening stations throughout the world to detect large explosions and missile launches at a great distance. The National Oceanic and Atmospheric Administration has experimented with the use of infrasound for severe weather detection. Infrasound has been used to detect the occurrence of noise from a building implosion at a distance of twenty-five miles. It is likely that infrasound may be usable to detect and identify certain distant incidents/events of interest, such as objects dropping in water, explosions, wakes of aircraft and missiles, boats moving slowly, and vehicle and personnel movement associated with urban warfare. It is also likely that infrasound may be usable to detect natural events, such as clear air turbulence, distant forest fires, volcanic eruptions, meteors, tornadoes, landslides, and hurricanes.

Some weather-related natural events may currently be detected using electromagnetic (EM) detection systems, such as radar. However, such use of EM sensors has several drawbacks. First, EM sensors are unable to receive signal returns in clear air, where reflective targets (e.g., precipitation, particulate matter) are absent. Second, EM systems, being active, require scanning to locate an event. Third, EM systems, even weather radar (e.g., Doppler radar), have a limited range thereby requiring a large number of individual radar stations to provide detection over a large area. For example, the U.S. National Weather Service's Next-Generation Radar (NEXRAD) system uses 158 radar stations located across the U.S. to provide adequate detection.

Received infrasound signals are typically of low intensity (i.e., weak), and, as such, infrasound detection systems require highly sensitive microphones. A microphone is an acoustic transducer which produces an electrical signal as a result of a time-varying pressure in the air immediately in front of the microphone membrane. Several different types of microphones are available, with each type of microphone having a distinct transduction mechanism. In condenser and electret microphones, the transduction mechanism is based upon changes in the stored electric field energy. In a condenser microphone (also termed an air-condenser microphone), acoustic energy causes small movement of the microphone diaphragm (also termed a membrane), which serves as one plate of a parallel-plate capacitor. The condenser microphones are high-impedance devices with amplifiers located near the sensor itself. These microphones are stable with temperature and environmental changes because of stainless steel diaphragm. A condenser microphone requires a high DC voltage between the membrane and backplate, called the "polarization voltage." The polarization voltage is typically 200 volts for linear operation. In an air condenser microphone, the polarization voltage is applied from an external source. In a back-electret microphone, the polarization voltage is applied by means of a thin layer of electret material which is deposited on the backplate and subsequently polarized. Electret-based technology may provide reduced background noise because Johnson noise generated in the supporting electronics is reduced or minimized.

In a condenser microphone, an incident sound pressure excites motion of a stretched membrane or diaphragm. The motion of the membrane changes the capacitance between the membrane and backplate, thereby producing a proportional output voltage. Hence, the performance of this type of microphone depends upon an electrical as well as mechanical system of the microphone.

When a fixed charge is applied on the plates of the membrane-backplate capacitor through a large resistor, the motion of the membrane changes the voltage between the plates. The charge is maintained by a high voltage, called a "polarization" voltage. This technique has the advantage of very low thermal noise, thus providing very low threshold detectability (increased sensitivity). However, this technique suffers at low frequencies due to the finite charging time of the capacitor.

The function of the mechanical system of a condenser microphone is to provide damping of the membrane motion for an optimally flat microphone frequency response. The microphone operates at frequencies below the fundamental resonant frequency of the stretched membrane. At frequencies approaching the resonant frequency, the response shows a pronounced peak if the membrane is not properly dampened. As the membrane vibrates, it compresses and expands the air layer in the gap and creates a "reaction" pressure, which opposes the motion of the membrane. The reaction pressure generates airflow which introduces damping primarily at two places: in the gap between the membrane and the backplate, and in the openings (holes and slots) in the backplate. A sufficiently small gap may, by itself, provide the necessary membrane damping, but the necessary small size would conflict with the requirements of electrical and mechanical stability. The damping is thus augmented by the flow of air through the holes and slots in the backplate, which provide large surface areas for viscous boundary layer damping.

The backchamber serves as a reservoir for the airflow through the openings in the backplate. If the cartridge were perfectly sealed, then a constant quantity of air would remain within the microphone interior. A vibration in ambient pressure would result in a pressure differential across the membrane, a shift in the membrane's static position, and a change in microphone sensitivity. For this reason, a capillary vent hole is introduced to provide static pressure equalization on the two sides of the membrane. The capillary vent hole leads from the backchamber to outside of the microphone. However, the pressure equalization system, like the electrical charging system, causes the response to roll-off at low frequencies.

An equivalent circuit of a known polarized microphone is shown in FIGS. 2A and 2B of U.S. Pat. Nos. 9,591,417 and 8,401,217, the entire contents of each being incorporated herein by reference. An algorithm and software for recognition of ground-based, airborne, underground, and underwater low frequency events is disclosed in U.S. Patent Publication No. 2018/0210065, the entire contents of which are incorporated herein by reference.

Known acoustic measuring systems may not be suitable for some applications.

BRIEF SUMMARY OF THE INVENTION

One aspect of the present disclosure is an extremely low frequency microphone including a rigid housing forming an interior space comprising a backchamber. The housing includes an opening to the interior space, and a side of the housing comprises a diaphragm plate. The extremely low frequency microphone also includes a backplate inside the housing adjacent the diaphragm plate. A sealed electronics unit including a preamplifier is disposed in the interior space of the housing. The sealed electronics unit is operably connected to the backplate. The microphone further includes a dielectric liquid substantially filling the interior space. A plug is disposed in the opening of the housing. The plug includes at least one passageway that is configured to introduce inert gas (e.g., argon) into the dielectric liquid in the interior space of the housing. The argon gas prevents solidification (freezing) of the dielectric liquid at low temperatures.

Another aspect of the present disclosure is a method of fabricating an extremely low frequency microphone. The method includes forming a rigid housing from a corrosion-resistant material. The housing defines an interior space, and a portion of the housing comprises a diaphragm plate. A backplate is positioned inside the housing in the interior space adjacent to the diaphragm plate. A sealed electronics unit including a preamplifier is positioned inside the housing in the interior space adjacent the backplate. The method includes at least partially filling the interior space with a dielectric liquid, and introducing inert gas into the dielectric liquid. The method further includes sealing the housing.

These and other features, advantages, and objects of the present invention will be further understood and appreciated by those skilled in the art by reference to the following specification, claims, and appended drawings.

DETAILED DESCRIPTION OF THE INVENTION

Figure 1:
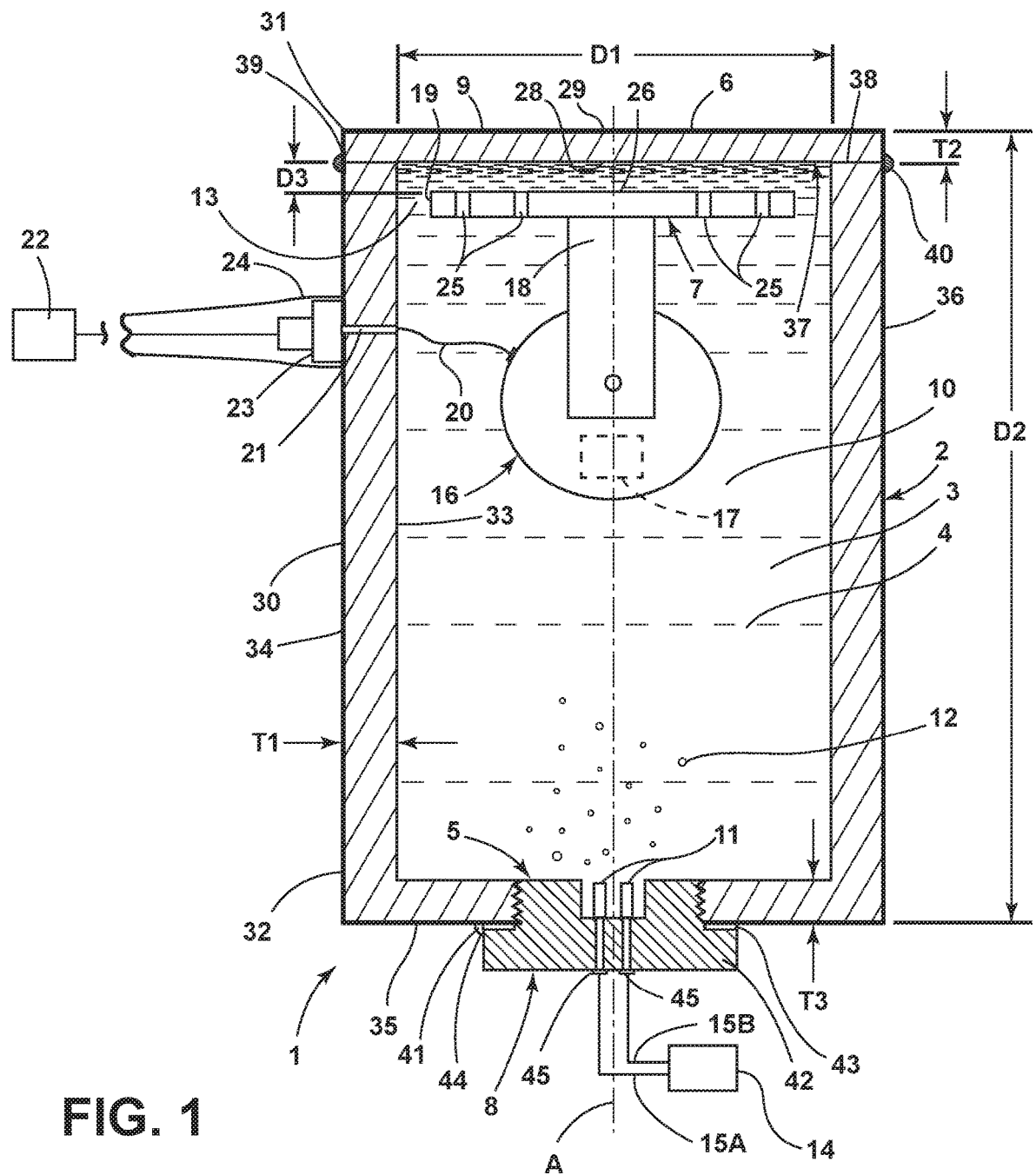
FIG. 1 is a partially schematic cross-sectional view of a low frequency microphone according to one aspect of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present application is related to U.S. Pat. No. 8,401,217, entitled "EXTREME LOW FREQUENCY ACOUSTIC MEASUREMENT SYSTEM," filed on Jul. 20, 2007, the entire contents of which are incorporated herein by reference. The present application is also related to U.S. Pat. No. 8,671,763, entitled "SUB-SURFACE WINDSCREEN FOR OUTDOOR MEASUREMENT OF INFRASOUND," filed on Aug. 5, 2010, the entire contents of which are incorporated herein by reference. The present application is also related to U.S. Pat. No. 9,591,417, entitled "EXTREME LOW FREQUENCY ACOUSTIC MEASUREMENT SYSTEM," filed on Feb. 20, 2013, the entire contents of which are incorporated herein by reference. The present application is also related to United States Patent Publication No. 2018/0210065, entitled "ADAPTIVE ALGORITHM AND SOFTWARE FOR RECOGNITION OF GROUND-BASED, AIRBORNE, UNDERGROUND, AND UNDERWATER LOW FREQUENCY EVENTS," filed on Jan. 19, 2018, the entire contents of which are incorporated herein by reference.

Various manmade and natural infrasound sources exist in the environment. Examples include severe storms, underwater volcanic eruptions, microbaroms, earthquakes, tsunamis, avalanches, and clear air turbulence. Acoustic energy from underwater sources can enter the atmosphere if the source depth is less than an acoustic wavelength otherwise almost all energy is reflected back at water-air interface. Using a suitable detection system, sources of these infrasound can be identified and located. An example is that a satellite orbiting at the outer-edge of Earth's atmosphere detected infrasound from a powerful earthquake, the epicenter of which was at a depth of 18.6 miles below the floor of the western Pacific Ocean. Studies suggest that immense deep-ocean waves (extreme low frequency range) transport salts, carbons, and other nutrients around the globe in a matter of hours. Another example is where the infra-gravity or Acoustic gravity waves are compression type waves that are generated by wind-wave and wave-wave interactions, movements of the tectonic lithosphere plates, landslides, and submarine explosions.

All these phenomena can be further explored by using underwater infrasonic hydrophones. In general, an infrasonic hydrophone is a microphone designed to be used for underwater infrasonic measurements. In contrast to microphones, hydrophones may be designed (configured) to match the acoustic impedance of water, a denser fluid than air. Hydrophones may include a piezoelectric transducer that generates an electric potential when exposed to a sound wave. An infrasonic hydrophone according to the present disclosure may utilize electret-based technology. This technology reduces possible background noise ("Johnson noise"), because Johnson noise generated in the supporting electronics is reduced or minimized.

Figure 2:
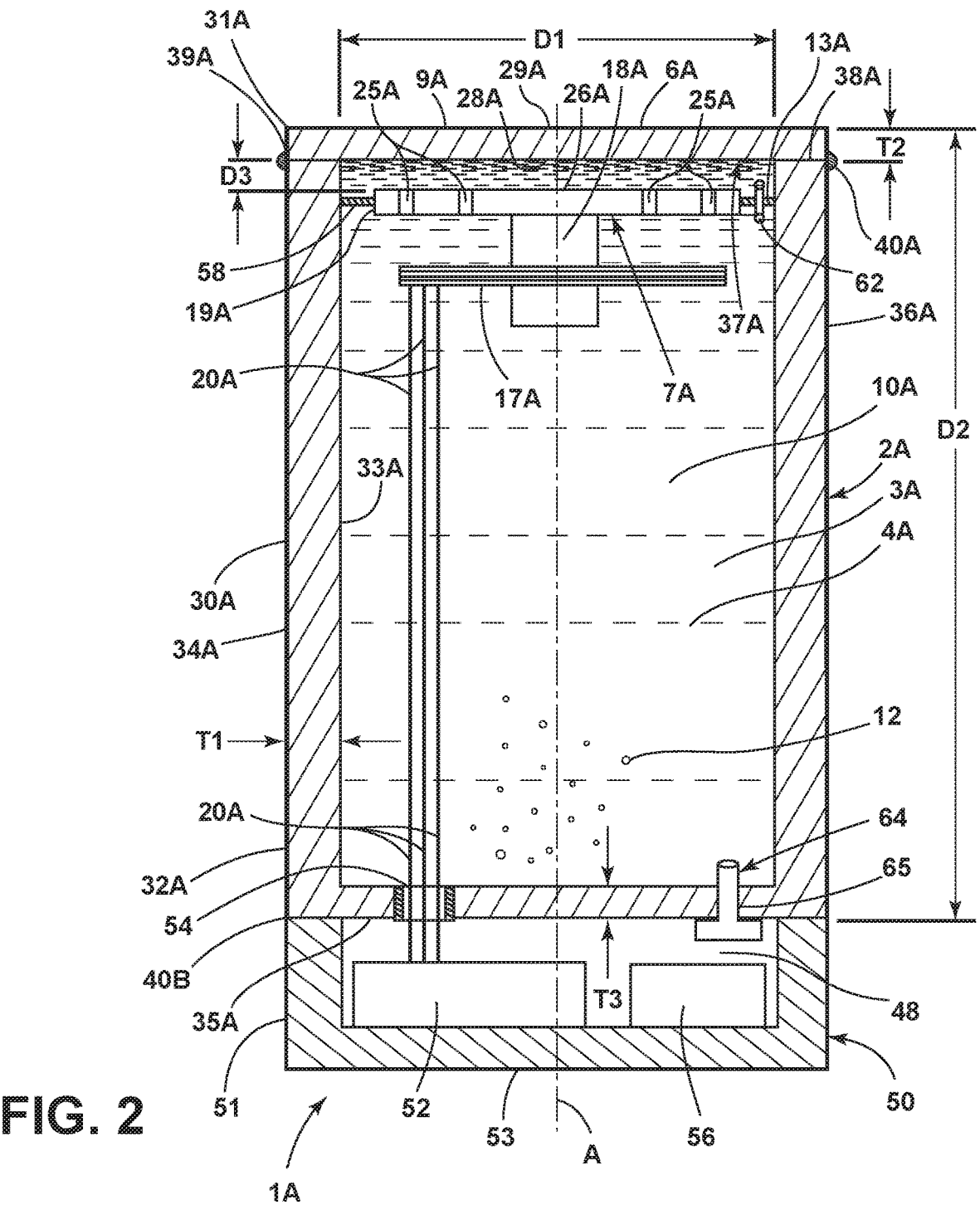
FIG. 2 is a partially schematic cross-sectional view of a low frequency microphone according to another aspect of the present disclosure.

As noted, this new design includes underwater measurement applications and applications in a high pressure environment, with embodiments of the extremely low frequency hydrophone having a low frequency response bandwidth from 0.1 mHz to 100 Hz. The housing of an infrasonic hydrophone according to the present disclosure can be made of aluminum, stainless steel, corrosion resistant alloys (e.g., nickel chromium superalloys) available under the INCONEL® name of Huntington Alloys Corporation (or "Inconel"), or any other metal suitable for underwater applications. With reference to FIG. 1, an extremely low frequency hydrophone 1 according to one aspect of the present disclosure is generally cylindrical in shape and defines a centerline or axis "A." An extremely low frequency hydrophone 1A according to another aspect of the present disclosure is shown in FIG. 2. Extremely low frequency hydrophones 1 and 1A may utilize electret-based technology and includes rigid housings 2, 2A forming interior spaces 3, 3A including backchambers 4, 4A. The housing 2 may include a plug opening 5 (FIG. 1), and a plug 8 disposed in the opening 5 of housing 2. As discussed in more detail below, extremely low frequency hydrophone 1A (FIG. 2) includes an end cap 50 and second chamber 48. Sides 9, 9A of housings 2, 2A comprise diaphragm plates 6, 6A that are generally cylindrical or circular in shape. Each extremely low frequency hydrophone 1, 1A further includes a generally circular/cylindrical backplate 7, 7A disposed inside the housing 2, 2A adjacent the diaphragm plate 6, 6A. Dielectric liquid 10, 10A (e.g., oil) substantially fills the interior space 3, 3A. Plug 8 of extremely low frequency hydrophone 1 (FIG. 1) may include at least one passageway 11 that is configured to introduce inert gas which may be in the form of bubbles 12 into the dielectric liquid 10 in the interior space 3. Extremely low frequency hydrophone 1A (FIG. 2) includes a one-way valve 64 to introduce inert gas 12 into interior space 3A. The inert gas 12 may comprise argon gas that is supplied from a source 14 through one or more lines 15A, 15B that are operably (i.e., fluidly) connected to the passageways 11 of plug 8. Passageways 11 are sealed after the inert gas 12 is introduced into interior space 3 of housing 2.

The extremely low frequency hydrophone 1 (FIG. 1) includes a sealed electronics unit 16 comprising a preamplifier 17. The sealed electronics unit 16 is disposed in the interior space 3 of the housing 2. The sealed electronics unit 16 is operably connected to the backplate 7 by a support structure 18. One or more lines 20 extend through an opening 21 in housing 2 to operably connect the sealed electronics unit 16 to one or more exterior electrical components 22 disposed outside of housing 2. Opening 21 may be sealed by a hermetic cover 24, and a fitting 23 may be utilized to support the hermetic cover 24 and/or to support and guide the lines 20. The lines 20 may comprise electrically conductive (e.g., metal) lines providing power and/or data interconnection between sealed electronics unit 16 and one or more exterior electronic components 22. Electronics unit 16 may be substantially similar to one or more of the corresponding units disclosed in U.S. Pat. Nos. 8,401,217, 8,671,763, and 9,591,417, and U.S. Patent Publication No. 2018/0210065, which are hereby incorporated in their entirety by reference for all purposes.

Figure 3:
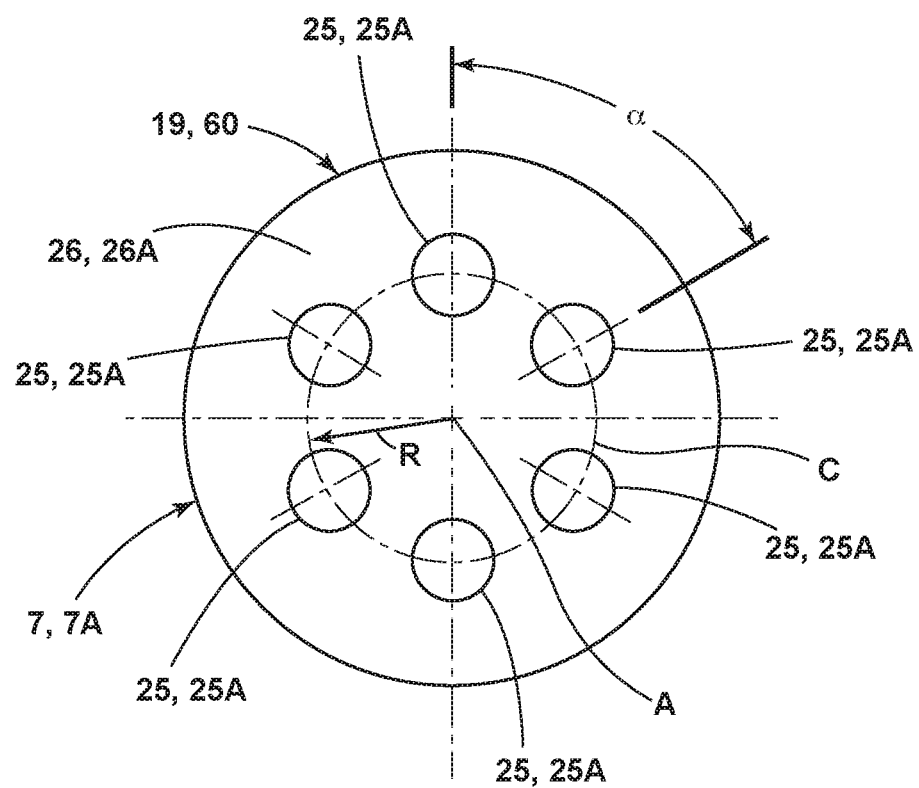
FIG. 3 is a top plan view of a backplate.

Backplates 7, 7A have a generally circular or cylindrical peripheral edge 19, 19A, and include one or more openings 25, 25A, and a surface 26, 26A. Surface 26, 26A may optionally comprise a polarized polymer film whereby the microphone 1, 1A comprises an electret microphone. Although extremely low frequency hydrophone 1, 1A could comprise a condenser microphone, the electret configuration is preferred because a voltage does not need to be applied between the diaphragm plate 6, 6A and backplate 7, 7A. The size and shape of backplate 7, 7A may be substantially identical to the backplate described in U.S. Pat. No. 9,591,417. In particular, the sizes and locations of the openings 25, 25A may be substantially the same as disclosed in U.S. Pat. No. 9,591,417 (e.g., FIG. 5 of U.S. Pat. No. 9,591,417). An inner diameter "D1" of diaphragm plate 6, 6A may be about 1.0 inches, about 1.5 inches, about 3.0 inches, or other suitable dimension. If diaphragm plate 6, 6A has a diameter D1 of 3 inches, backplate 7, 7A may include six throughholes 25, 25A, and each hole 25, 25A may have the following characteristics/dimensions:

Distance "R" (FIG. 3) from center (axis A) of backplate 7, 7A to center of hole 25, 25A=0.0105 m (0.4134 in);

Radius of hole 25, 25A=0.00302 m (0.1189 in);

Depth of hole 25, 25A=0.00254 m (0.1 in);

Angle between two radial lines going from center "A" of backplate 7, 7A to either side edge of hole 25, 25A=33 degrees;

Angle $\alpha$ between centers of adjacent holes 25=60 degrees; and

Area of hole 25, 25A=0.000286 m$^2$ (0.4433 in$^2$)

Surface 26, 26A of backplate 7, 7A is preferably spaced from surface 28, 28A of diaphragm plate 6, 6A a gap or distance "D3" of approximately 0.001 inch. It will be understood that the distance D3 may vary (e.g., gap D3 may be about 0.0005 inches, 0.001 inches, 0.0015 inches, 0.002 inches, 0.010 inches, or more). The distance D3 may be substantially equal to the corresponding distances described in U.S. Pat. No. 9,591,417.

Housing 2, 2A may include a cylindrical sidewall 30, 30A centered on axis A and extending between first end 31, 31A and a second end 32, 32A. Inner and outer surfaces 33, 33A and 34, 34A, respectively, of sidewall 30, 30A may be substantially cylindrical. An inner diameter "D1" of diaphragm plate 6, 6A (also centered on axis A) may be about 1.0 inches, about 1.5 inches, about 3.0 inches, or other suitable dimension. The overall length "D2" of housing 2, 2A may be about 5 inches. Sidewall 30, 30A has a thickness "T1" of approximately 0.50 inches, diaphragm plate 6, 6A has a thickness "T2" of about 0.0125 inches to about 0.5 inches, end wall 35 has a thickness "T3" of about 0.25 to about 0.75 inches. The infrasonic microphone 1, 1A comprises a slot 13, 13A (in the form of a ring-shaped annular gap or space between outer edge 19, 19A of the backplate 7, 7A and the inner wall 33, 33A of the housing 2, 2A.

It will be understood that the dimensions T1-T3 of extremely low frequency hydrophone 1 and 1A may vary according to the requirements of a particular application. The housings 2 and 2A are preferably made of a corrosion-resistant material such as stainless steel. For example, housings 2 and 2A may comprise 625 INCONEL® alloy, C-276 ludium alloy, or other suitable material. The sidewall 30, 30A and end wall 35, 35A are preferably sufficiently thick to prevent deflection when extremely low frequency hydrophone 1, 1A is subject to a high pressure environment (e.g., a deep sea application).

The thickness T2 of diaphragm plate 6, 6A may be varied as required for a particular application. For example, the dimension T2 of diaphragm plate 6, 6A may be about 0.18 inches (or less), about 0.25 inches, about 0.35 inches, about 0.50 inches, or greater. If extremely low frequency hydrophone 1, 1A is to be used for an underwater application at a relatively shallow depth (e.g., 2 meters), dimension T2 may be about 0.18 inches. However, if extremely low frequency hydrophone 1, 1A is to be used in a deep sea application having very high pressures, the dimension T2 may be 0.50 inches or greater. In general, the dimension T2 can be varied as required to withstand the pressures of a use environment without plastically deforming or collapsing.

If diameter D1 is about 3.0 inches, slot 13, 13A may have the following characteristics/dimensions:
Distance from center "A" of backplate 7, 7A=0.0198 m (0.780 in);
Width=0.0144 m (0.0567 in);
Depth=0.00254 m (0.1 in); and
Area=0.00179 $m^2$ (2.7745 $in^2$).

If diameter D1 of diaphragm plate 6, 6A is about 3.0 inches, the infrasonic hydrophone 1, 1A may have the following characteristics/dimensions:
Volume of backchamber 4, 4A=0.0002 $m^3$ (12.2047 $in^3$);
Membrane mass=63.86 kg/$m^4$ (5.86×$10^{-5}$ lb/$in^4$);
Membrane compliance—3.8×$10^{-10}$ $m^3$/N (0.15989 $in^5$/lb); and
Air gap compliance—1.4×$10^{-9}$ $m^5$/N (0.58904 $in^5$/lb).

If diameter D1 of diaphragm plate 6, 6A is about 1.5 inches, the diaphragm plate 6, 6A of the microphone 1, 1A may comprise a stainless steel plate having a thickness between about 0.0125 inches and about 0.5 inches. If D1 is 1.5 inches, the slot 13, 13A may have the following characteristics/dimensions:
Distance from center "A" of backplate 7, 7A=0.0117 m (0.4606 in);
Width=0.00351 m (0.1382 in);
Depth=0.00114 m (0.0449 in); and
Area=0.000258 $m^2$ (0.3999 $in^2$).

If diameter D1 of diaphragm plate 6, 6A is about 1.5 inches, the backplate 7, 7A of the infrasonic microphone 1, 1A may include six through-holes 25, 25A and each hole 25, 25A may have the following characteristics/dimensions:
Distance from center "A" of backplate 7, 7A to center of hole 25, 25A=0.0526 m (2.07 in);
Radius=0.002 m (0.0787 in);
Depth=0.045 m (1.77 in);
Angle between two lines going from center of backplate 7, 7A to either side edge of hole 25, 25A=43.5 degrees; and
Area=1.26×$10^{-5}$ $m^2$ (0.01953 $in^2$).

If diameter D1 of diaphragm plate 6, 6A is about 1.0 inches, the diaphragm 6, 6A of the microphone/hydrophone 1, 1A may comprise an aluminum or stainless steel plate having a thickness between about 3.81 E-04 to about 1.27 E-02 depending upon the requirements for a particular application of the microphone/hydrophone 1, 1A. If D1 is about 1.0 inches, the volume of the backchamber 4, 4A may be about 2×$10^{-5}$ meters.

A microphone/hydrophone 1, 1A according to the present disclosure can be used in the air, on the ground, in shallow water, or at bottom of the ocean. For airborne, ground, or shallow water applications, the following specifications may be utilized:
Membrane/Diaphragm Plate 6, 6A
Radius=0.897 m (0.3531 in)
Density=8800 Kg/$m^3$ (0.31792 lb/$in^3$)
Surf Dens=0.0880 Kg/$m^2$ (1.2516E-04 lb/$in^2$)
Thickness=3.81 E-04 m (0.015 in)
Tension=200.00 N/m (1.14203 lb/in)
Stress=47.6731 (PSI)
Gap ("D3") Specifications (air or fluid dielectric material)
Gap=0.75000 E-04 m (0.2953 E-02 in)
Viscosity=0.18000 E-04 Pascal-second
Density=1.2050 Kg/$m^3$ (4.3533×$10^{-5}$ lb/$in^3$)
Sound Velocity=290.000 m/s (11417 in/s)
GAMMA=1.4000
Slot 13, 13A of Backplate 7, 7A
Location=0.89700 E-02 m (0.35315 in) Width=0.23000 E-02 m (0.09055 in)
Depth=0.75000 E-03 m (0.02953 in) Area=0.129628 E-03 $m^2$ (0.2009 $in^2$)
Holes 25, 25A:
Ring (i.e., circular pattern "C", FIG. 3)
Number=6
Location (radius of circular pattern "C", FIG. 3)=0.35000 E-02 m (0.13779 in)
Depth=0.11400 E-02 m (0.04488 in)
Area=0.31416 E-05 $m^2$ (0.004869 $in^2$)
Radius=0.10000 E-02 m (0.03937 in)
Angle α (FIG. 3)=60 degrees (angle between centers of equally spaced holes 25, 25A).

The locations and sizes of the holes 25, 25A, the size of the slot 13, 13A, and the volume of the backchamber 4, 4A are selected such that the motion of membrane/diaphragm 6, 6A is substantially critically damped. When an external pressure starts vibrating diaphragm 6, 6A, it pushes the air or dielectric fluid between diaphragm 6, 6A and the backplate 7, 7A towards backchambers 4, 4A through the slot 13, 13A and holes 25, 25A. The time taken by the air or fluid to completely pass to the backchamber 4, 4A depends upon slot and holes depth as well. Thus, the depth of slot 13, 13A and holes 25, 25A is included as noted above.

During fabrication, main housing body 36, 36A including sidewalls 30, 30A and end wall 35, 35A may be formed from a single piece of metal utilizing known machine operations. The main housing 36, 36A initially includes an opening 37, 37A with an annular surface 38, 38A of sidewall 30, 30A extending around the opening 37, 37A. The diaphragm plate 6, 6A is initially a separate disk-shaped component having a cylindrical outer surface 39, 39A. Opposite surface 28, 28A of diaphragm plate 6, 6A is preferably polished. Because the hydrophone 1, 1A is extremely sensitive, it is capable of picking up turbulence caused by even the smallest wind shear/barrier. Polishing surfaces 28, 28A, 29, 29A avoids turbulence that could be caused by an uneven surface and/or particles stuck to diaphragm 6, 6A. The diaphragm plate 6, 6A is preferably made from the same material as main housing 36, 36A, and the diaphragm plate 6, 6A is welded to the main housing 36, 36A by weld material 40, 40A extending around diaphragm plate 6, 6A. The weld material 40, 40A seals the first end 31, 31A of housing 2, 2A to diaphragm plate 6, 6A to thereby prevent entry of air, water, or the like into the interior space 3, 3A of housing 2, 2A.

The backplate 7 of extremely low frequency hydrophone 1 (FIG. 1) and sealed electronics unit 16 are preferably positioned (i.e., mounted) in the interior space 3 of main housing 36 before the diaphragm plate 6 is welded to the main housing 36. The lines 20 are also preferably routed through opening 21 in sidewall 30 of housing 2 before diaphragm plate 6 is welded to the main housing 36.

Referring again to FIG. 1, the end wall 35 of housing 2 may include a threaded plug opening 5 that threadably receives plug 8. Plug 8 may be made from substantially the same material (e.g. metal) as housing 2. During fabrication of extremely low frequency hydrophone 1, dielectric liquid 10 is introduced into interior space 3 through plug opening 5 prior to installation of plug 8. For example, the housing 2 may be positioned with opening 5 facing upwardly (i.e., rotated 180-degrees relative to the orientation of FIG. 1), and dielectric liquid 10 may be poured into interior space 3 through plug opening 5. The dielectric liquid 10 may comprise oil or other suitable liquid. The dielectric liquid flows into the space between diaphragm plate 6 and backplate 7 to prevent breakdown (electric arcing) between diaphragm plate 6 and backplate 7.

After the interior space 3 of housing 2 is filled with dielectric liquid 10, plug 8 is installed in opening 5 by threadably engaging the plug 8 with opening 5. Plug 8 may include a flange 42 that engages resilient seal material 43 to seal the interior space 3 and prevent escape of dielectric liquid 10. Resilient material 43 is optional, and flange 42 may directly contact end wall 35. Weld material 41 may be utilized to secure plug 8 to end wall 35 and to seal the plug 8 to end wall 35 at joint 44. Weld material 41 preferably extends around the entire joint 44 to completely seal plug 8 to end wall 35 of housing 2.

An inert gas 12 (e.g., argon) is then introduced into interior space 3 of housing 2 through passageways 11 in plug 8. Lines 15A and 15B may be operably connected to the passageways 11 to thereby transfer the argon gas 12 from a gas source 14. The argon gas 12 may form bubbles 12 in dielectric liquid 10. The passageways 11 may comprise a one-valve that prevents back flow of dielectric liquid 10 and/or gas 12 from interior space 3 of housing 2. The inert gas 12 may optionally be pressurized to thereby pressurize the dielectric liquid 10 disposed in interior space 3 of housing 2. After the inert gas 12 is introduced into interior space 3 of housing 2, the passageways 11 are closed off by weld material 45 or other suitable sealing material.

With further reference to FIG. 2, the extremely low frequency hydrophone 1A includes a housing 2A that may be similar to the housing 2 (FIG. 1) described in more detail above. In particular, the dimensions of the diaphragms 6, 6A, backplates 7, 7A, backchamber 4, 4A, etc. may be substantially identical. Extremely low frequency hydrophone 1A includes a second chamber 48 that may be formed by an end cap or structure 50 that is secured to end 32 of main housing 2A. An electronics/pre-amplifier board 17A of extremely low frequency hydrophone 1A is disposed in backchamber 4A, and it is connected to backplate 7A by a structure 18A. Electronics 52 are disposed in second chamber 48, and electronics 52 are operably interconnected to the electronics/pre-amplifier board 17A by lines 20A, which pass through a sealed port 54 in end wall 35. Electronics 52 may comprise digitization (e.g., an AD converter) and/or a microprocessor, and/or memory (e.g., data storage device), and/or a wireless transmitter and/or receiver, and/or other devices required to process and/or store and/or transmit data received from electronics/preamplifier board 17A. An electrical power source 56 is also disposed in second chamber 48 to power the electronics board 17A and electronics unit 52. Electrical power source 56 may comprise one or more batteries. The electronics board 17A can be potted with electronic grade potting material. In general, the lines 20A may comprise power lines and signal wires or other lines as may be required. The second chamber 48 may be filled with oil or other dielectric liquid 10A, or the second chamber 48 may be filled with potting material, air, inert gas, or other suitable fluid. Electronics 52 and/or 56 may be mounted in backchamber 4 or 4A. However, this would potentially reduce backchamber volume, and diaphragm motion (which reflects external pressure) may not be substantially critically damped. Thus, the volume of the first backchamber 4, 4A is preferably controlled/configured such that membrane/diaphragm motion is substantially critically damped. Keeping the first and second backchambers separate from one another ensures that the first volume 4, 4A is used for damping the diaphragm motion, and the second backchamber volume 48 can house the AD converter, related electronics, and batteries. The end cap 50 may have an annular sidewall 51 having a thickness T1 that is substantially identical to the thickness T1 of housing 2A, and an end wall 53 having a thickness T3 that is substantially identical to the thickness of end wall 35 of housing 2A. The end cap 50 may be formed as a one-piece member that is welded to housing 2A by weld 40B after gas 12 is introduced into backchamber 4A through valve 64.

The backplate 7A is supported by a non-conductive support 58 extending between outer edge 19A of backplate 7A and inner surface 33 of housing 2A. The non-conductive support 58 may comprise a flexible material, a rigid material, polymer, rubber elastomeric material, or virtually any other material, and the non-conductive support 58 may be permeable and/or include openings (not shown) to permit flow of liquid through annular gap 13A. A tube 62 extends through the non-conductive support 58 to permit dielectric liquid 10A to pass through the tube 62. For example, before diaphragm plate 6A is welded to the housing 2A, the backplate 7A may be positioned in backchamber 4A, and oil or other dielectric liquid 10A may be used to fill the backchamber 4A by connecting a syringe, funnel, or other source (not shown) of liquid to the tube 62 whereby the dielectric liquid 10A flows through the tube 62 into the backchamber 4A. The diaphragm plate 6A is then welded to sidewall 30A at weld 40A in substantially the same manner as discussed in more detail above.

The extremely low frequency hydrophone 1A further includes a one-way valve 64 that extends through an opening 65 in end wall 35 of housing 2A. The one-way valve 64 may be utilized to introduce inert gas 12 into backchamber 4A.

The extremely low frequency hydrophone 1A (FIG. 2) may have any of the dimensions D1 and other spacing, and other dimensions as discussed above. In general, the sidewall of the housing 2A may be about 0.125 inches to about 0.5 inches (without changing the volume of backchamber 4A). For example, if the extremely low frequency hydrophone 1A is to be used in shallow water, a thickness of 0.125 inches may be utilized. However, if the extremely low frequency hydrophone 1A is to be utilized at a greater depth (e.g., the bottom of the ocean), the wall thickness of housing 2A may be about 0.5 inches. However, the present disclosure is not limited to any specific housing size, configuration, wall thickness, or the like, and the specific dimensions, shapes, and other features may vary as required for a particular application.

In operation, the extremely low frequency hydrophone 1, 1A may be lowered into a body of water (e.g., an ocean) and lowered to a depth at which the extremely low frequency hydrophone 1, 1A is subject to high pressures and low temperatures. The inert gas 12 lowers the freezing temperature of the dielectric liquid 10, 10A to ensure that the dielectric liquid 10, 10A does not freeze or otherwise interfere with normal operation of the extremely low frequency hydrophone 1, 1A.

The sealed electronics unit 16 (or 52) may include a microprocessor, digitizer, and a memory unit (e.g., volatile or non-volatile data storage). The lines 20 of FIG. 1 (if used) may be disconnected from external components 22 prior to positioning the extremely low frequency hydrophone 1 at a deep sea location. The sealed electronics unit 16 (or 52) may store data collected during operation, and the extremely low frequency hydrophone 1, 1A may be returned to the surface. The data may then be retrieved from the memory storage of sealed electronics unit 16 via lines 20 or from unit 52. The sealed electronics unit 16 (or 52) may also or alternatively include a wireless transmitter that may be utilized to transfer data from the sealed electronics unit 16 or 52 to an external unit 22. It will be understood that the wireless transmitter may comprise a long range transmitter that can transmit data while the extremely low frequency hydrophone 1 or 1A is in a data gathering location (e.g., a deep sea location), or the wireless transmitter may comprise a short range transmitter whereby the extremely low frequency hydrophone 1 or 1A must be returned to the surface to retrieve data from the sealed electronics unit 16 or 52.

Extremely low frequency hydrophones 1 or 1A may be configured for use in the adaptive algorithm and software arrangement of U.S. Patent Publication No. 2018/0210065. In particular, three or more of the extremely low frequency hydrophone units 1 or 1A may be configured as described in U.S. Patent Publication No. 2018/0210065 to detect low frequency events.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An extremely low frequency hydrophone having a frequency response bandwidth from 0.1 mHz to 100 Hz, the hydrophone comprising:
   a housing forming an interior space comprising a backchamber, the housing including an opening to the interior space, and wherein a side of the housing comprises a diaphragm plate;
   a backplate inside the housing adjacent the diaphragm plate;
   a sealed electronics unit including a preamplifier disposed in the interior space operably connected to the backplate;
   dielectric liquid substantially filling the interior space;
   at least one of a valve and a plug disposed adjacent the opening of the housing to permit inert gas to be introduced into the dielectric liquid in the interior space.

2. The extremely low frequency hydrophone of claim 1, wherein:
   the housing and the diaphragm plate comprise at least one of aluminum, stainless steel, and nickel alloy.

3. The extremely low frequency hydrophone of claim 1, wherein:
   the housing defines first and second opposite ends and a sidewall extending between the first and second opposite ends, wherein the diaphragm plate is welded to the sidewall at the first end of the housing whereby the housing includes weld material securing the diaphragm plate to the sidewall of the housing.

4. The extremely low frequency hydrophone of claim 3, wherein:
   the sidewall has a substantially cylindrical inner surface having a diameter of about 1-3 inches.

5. The extremely low frequency hydrophone of claim 4, wherein:
   the sidewall has an inner surface having a diameter of about 1.9 inches.

6. The extremely low frequency hydrophone of claim 4, wherein:
   the sidewall has a thickness of about one-half inch.

7. The extremely low frequency hydrophone of claim 1, wherein:
   the diaphragm plate has a thickness of about 0.18 inches.

8. The extremely low frequency hydrophone of claim 1, wherein:
   the dielectric liquid comprises oil.

9. The extremely low frequency hydrophone of claim 1, including:
   a plug; and wherein:
   the opening in the housing is threaded;
   the plug includes threads engaging the threaded opening.

10. The extremely low frequency hydrophone of claim 9, wherein:
    the plug is welded to the housing.

11. The extremely low frequency hydrophone of claim 1, wherein:
    the interior space includes an electronics chamber that is separated from the backchamber by a wall; and
    an electronics unit disposed in the electronics chamber.

12. The extremely low frequency hydrophone of claim 11, wherein:
    the electronics chamber is substantially filled with dielectric liquid.

13. The extremely low frequency hydrophone of claim 1, wherein:
    the backplate includes a thin layer of polarized polymer film whereby the extremely low frequency hydrophone comprises an electret microphone.

14. The extremely low frequency hydrophone of claim 1, wherein:
    the sealed electronics unit includes data storage and/or a wireless transmitter.

15. The extremely low frequency hydrophone of claim 1, including:
    a non-conductive support connecting the backplate to the housing;
    a tube or passageway extending through the non-conductive support to permit fluid entry to substantially fill the backchamber.

16. A method of fabricating an extremely low frequency hydrophone, the method comprising:
    forming a rigid housing from a corrosion-resistant material, wherein the housing defines an interior space and a portion of the housing comprises a diaphragm plate;
    positioning a backplate inside the housing in the interior space adjacent to the diaphragm plate;
    positioning sealed electronics inside the housing in the interior space adjacent the backplate;
    at least partially filling the interior space with a dielectric liquid;
    introducing inert gas into the dielectric liquid; and
    sealing the housing.

17. The method of claim 16, wherein:
forming a rigid housing includes welding the diaphragm plate to a primary housing structure to close off an opening in the primary housing structure.
18. The method of claim 17, including:
forming a plug opening in the rigid housing;
causing dielectric liquid to pass through the plug opening;
positioning a plug in the plug opening.
19. The method of claim 18, wherein:
the plug includes at least one gas passageway; and including:
introducing an inert gas into the interior space through the gas passageway.
20. The method of claim 18, including:
attaching the backplate to the housing using a non-conductive support;
forming an electronics chamber that is sealed off from the interior space;
positioning an electronics unit in the electronics chamber;
operably interconnecting the electronics unit to the sealed electronics in the interior space using one or more lines;
introducing dielectric liquid into the interior space.

* * * * *